US005346358A

United States Patent [19]

Benuzzi

[11] Patent Number: 5,346,358

[45] Date of Patent: Sep. 13, 1994

[54] APPARATUS FOR AUTOMATICALLY STACKING DIFFERENTLY SIZED PANELS OR PACKES OF PANELS

[75] Inventor: Piergiorgio Benuzzi, Bologna, Italy

[73] Assignee: Giben Impianti S.P.A., Pianoro, Italy

[21] Appl. No.: 933,684

[22] Filed: Aug. 24, 1992

[30] Foreign Application Priority Data

Sep. 13, 1991 [IT] Italy ..................... GE91 A 0000113

[51] Int. Cl.[5] ............................................. B65G 57/08

[52] U.S. Cl. ................................ 414/790.9; 198/379; 198/399

[58] Field of Search ..................... 414/782, 783, 788.1; 198/379, 399

[56] References Cited

U.S. PATENT DOCUMENTS

| | | | |
|---|---|---|---|
| 3,581,868 | 2/1969 | French et al. | 198/379 |
| 3,590,975 | 6/1971 | Hollenton | 198/399 |
| 3,782,526 | 1/1974 | Simons | 198/399 |
| 4,121,403 | 10/1978 | Bogdanski et al. | 198/399 |
| 4,144,112 | 3/1979 | Hasegawa | 414/788.1 |
| 4,545,476 | 10/1985 | Calvert | 198/399 |
| 4,567,536 | 3/1986 | Benuzzi . | |
| 4,706,798 | 11/1987 | Hollman | 198/399 |

FOREIGN PATENT DOCUMENTS

| | | | |
|---|---|---|---|
| 1112946 | 5/1960 | Fed. Rep. of Germany | 198/399 |
| 2302001 | 7/1974 | Fed. Rep. of Germany | 198/399 |
| 3844016 | 6/1990 | Fed. Rep. of Germany | 198/399 |
| 4159915 | 6/1992 | Japan | 198/399 |

*Primary Examiner*—Michael S. Huppert
*Assistant Examiner*—Gregory A. Morse
*Attorney, Agent, or Firm*—Larson and Taylor

[57] ABSTRACT

Apparatus for automatically stacking differently sized packs of panels (P), or may be differently sized panels, formed by a dividing apparatus, on respective lifting platforms, such that packs of panels (P) of a same size will be stacked on one and the same lifting platform. The rows (H) of packs of panels (P) moved out of a cutting machine in the dividing apparatus, are shifted in a parallel direction to the final cutting line (Z) in the dividing apparatus. The rows (H) consisting of a plurality of successive packs of panels (P) having a same length but an even differentiated width, are fed to at least one transport runway (12) arranged at right angles thereto. The single packs of panels (P), or the single panels, composing a panel row (H), are then individually transferred to the transport runway (12) so as to be mutually set in line thereon in the same way. When the packs of panels (P), or the panels, are already disposed in this way, they are simply translated onto the runway (12), while in the contrary case they are turned, or turned over 90° around a vertical axis and simultaneously translated, so that the packs of panels are being properly disposed and laid on the transport runway (12). Lifting platforms (T) are provided at one side of the transport runway (12) for packs of panels (P), or may be panels, to be transferred thereto and stacked thereon.

13 Claims, 9 Drawing Sheets

Fig.4
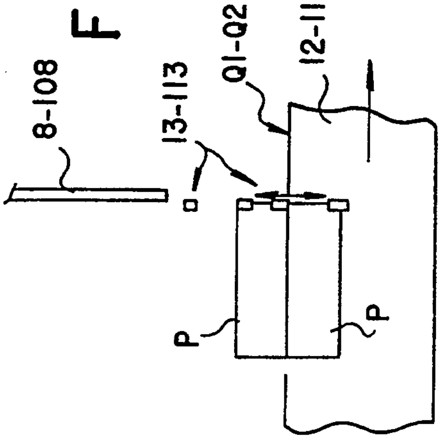
Fig.3
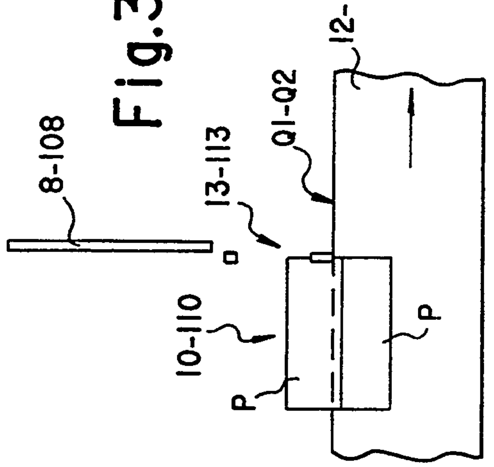
Fig.5
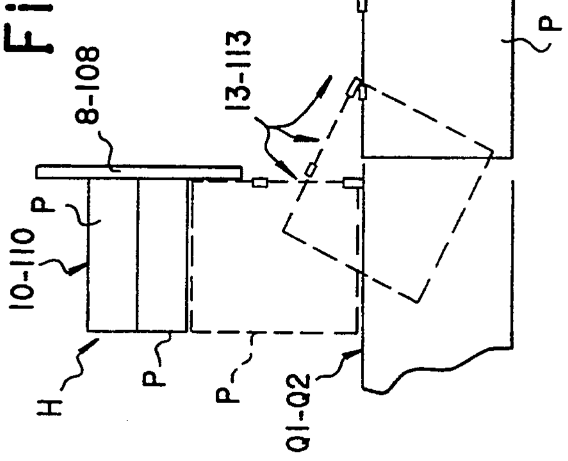
Fig.14
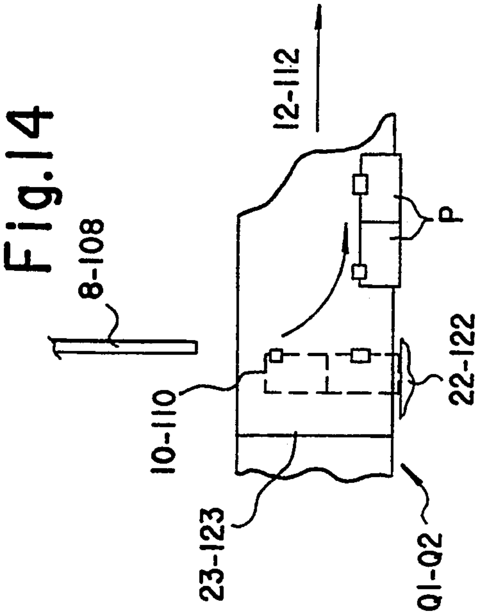
Fig.13
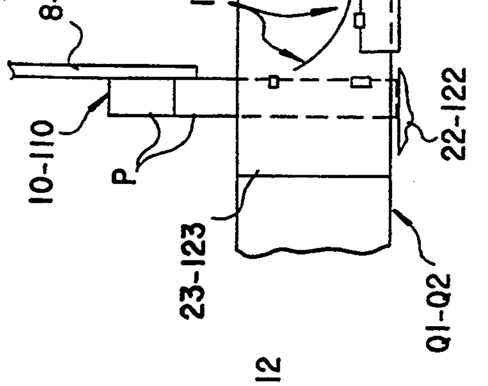
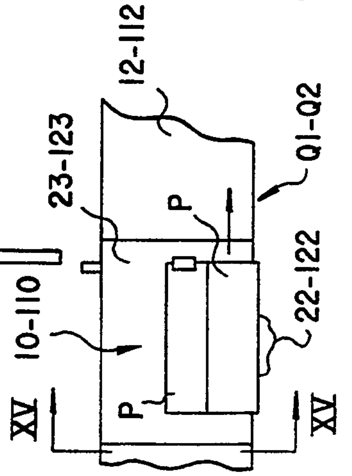
Fig.12

Fig.16
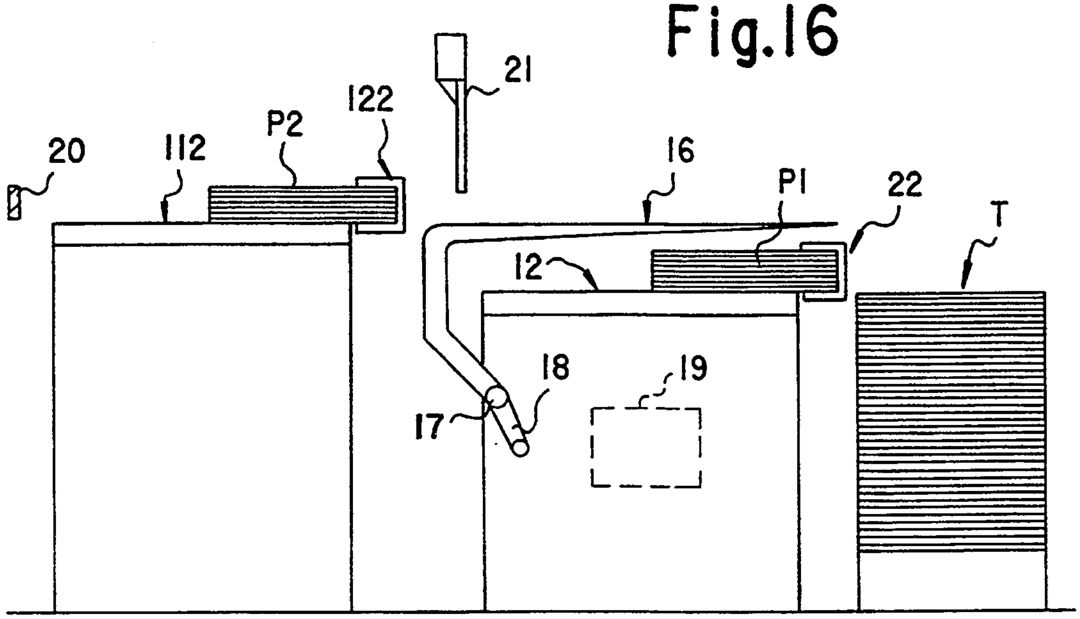
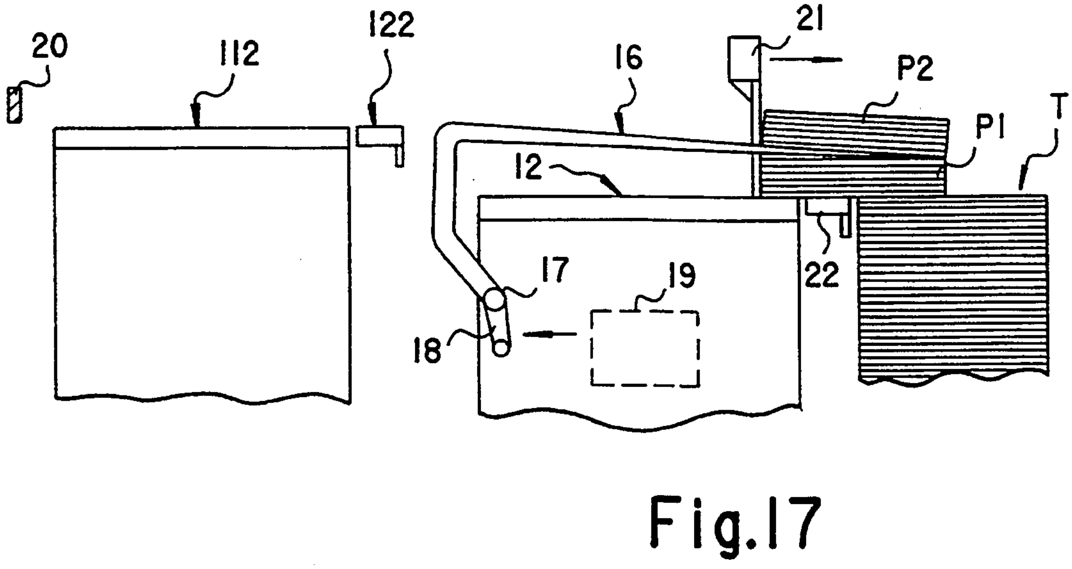
Fig.17

APPARATUS FOR AUTOMATICALLY STACKING DIFFERENTLY SIZED PANELS OR PACKES OF PANELS

SUMMARY OF THE INVENTION

The invention relates to an apparatus for automatically stacking differently sized packs of panels, or differently sized panels, is formed by a dividing apparatus, on respective lifting platforms. The stacking apparatus according to the invention, for example of the type as described in Italian Patent No. 1.156.610 in U.S. Pat. No. 4,576,536 in the name of the same Patentee, differs from the known stacking apparatus performing the same function, owing to the following features.

The rows of packs of panels, or of panels, moved out of the transverse cutting machine, are shifted either immediately after having been cut, or at successive times and stages, in a parallel direction to the final cutting line of the dividing apparatus. Thus, these panel rows sequentially following each other in the direction in which they are shifted. These rows, consisting of a plurality of packs of panels, or possibly of single panels, having a same width but an uneven differentiated length, are positioned the one after the other with their front side close to at least one transport runway. The transport runway is arranged at right angles with the panel rows, and onto this transport runway the single packs of panels, or the single panels, composing a panel row, are then individually transferred by suitable means, so as to be set in line with each other in the same way, such as with their long sides arranged lengthwise of the transport runway. When the packs of panels, or the panels, are already disposed in this way, they are simply translated onto the transport runway. Otherwise, they are turned over 90° around a vertical axis, and simultaneously translated, when required, so that these packs of panels are being properly disposed and laid on the transport runway. Lifting platforms are provided at one side of the transport runway, to which packs of panels, or of panels, are transferred and stacked thereon by suitable means, in the desired order that generally is such that the panels of a same size will be stacked on one and the same lifting platform.

The packs of panels are turned over 90° by a special gripper device provided with panel-clamping gripper members, and characterized by a high operating speed.

The stacking apparatus according to the invention differs from the known apparatus in that it is more easily constructed, and in that it affords a higher operating speed, as well as a greater reliability from the technical standpoint.

Further features of the invention and the advantages arising therefrom will become clearly apparent from the following disclosure of some preferred embodiments thereof, which are shown merely by way of non-limiting examples in the Figures.

BRIEF DESCRIPTION OF THE DRAWINGS

FIGS. 3, 4, and 5 are top plan views respectively showing possible operative modes of the device for feeding packs of panels to the transport runway interlocked with the lifting platforms on which packs of panels of a same size are respectively stacked.

FIGS. 12, 13, and 14 are top plan views showing further possible operative modes of the device for feeding packs of panels to the transport runway interlocked with the lifting platforms for stacking respective packs of panels of a same size.

FIGS. 16 and 17 are side views of a panel-stacking station in the stacking apparatus shown in FIG. 2, which is operated as shown in FIGS. 12, 13, and 14.

DETAILED DESCRIPTION OF THE PREFERRED EMBODIMENTS

Figure 1:
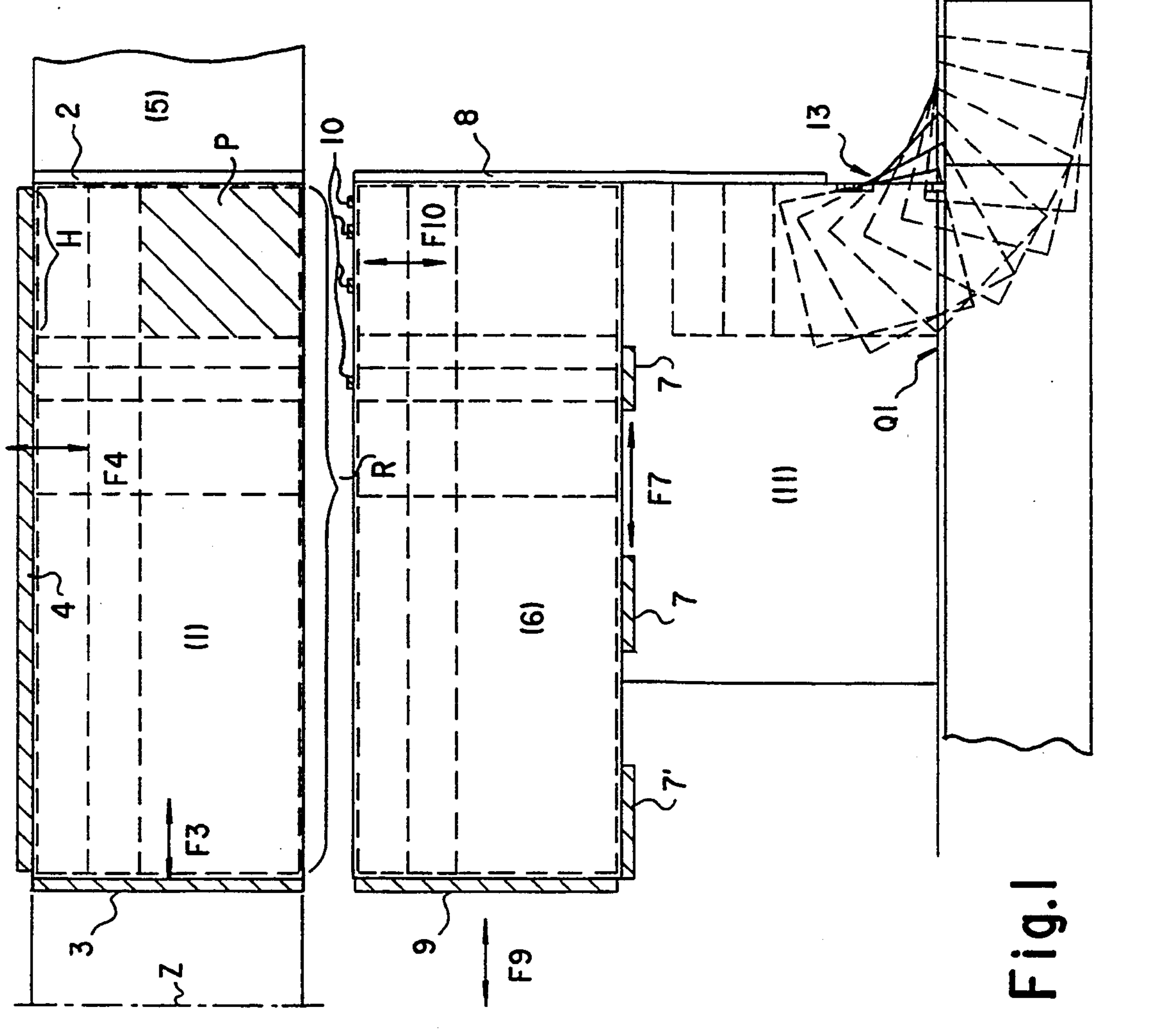
FIGS. 1 and 2 are plan views respectively showing a simple and a complex embodiment of the stacking apparatus.

In FIG. 1, reference letter Z denotes the final cutting line of a complex dividing apparatus. Rows H of packs of panels P, or of individual panels (hereinafter sometimes referred to as packs of panels for convenience), are cyclically moved out of the cutting line. The cutting line normally is for transverse cuts to be made in the packs of panels, or in the panels. The packs of panels P have in each row a same width dimension at right angles with the cutting line Z, and have an uneven length dimension which is parallel to the cutting line Z.

The packs of panels P forming each row H, have to be automatically stacked on respective lifting platforms T, usually or preferably with equally sized packs of panels P stacked on each lifting platform.

Downstream of the cutting line Z, a table 1 is suitably provided for supporting thereon the side-by-side rows H of packs of panels P cut from a pack of large boards R. The packs of panels P forming each row, may be square or rectangular in shape and, in this latter instance, they may be disposed with their long sides directed parallel or perpendicular to the cutting line Z.

A panel stopping and aligning bar member 2 arranged parallel to the cutting line Z, is provided at the one end side of table 1. A blade-like member 3 which can be driven into a motion of translation in either direction of the double arrow F3, and which can be lowered and lifted, is provided for recomposing or aligning against the panel-stopping and aligning bar member 2, a pack of large boards R which by the dividing apparatus has been cut into packs of panels P, according to a cutting pattern that is usually called "logic".

At one side of table 1 a straight bar member 4 is provided in perpendicular relationship with the cutting line Z, for guiding the rows H of packs of panels P while these rows are being arranged on table 1. The bar member 4 can be driven into a motion of translation in either direction of the double arrow F4, and can be lowered and lifted, just like the blade-like member 3.

In order to improve the operation of the considered stacking apparatus, the possibility is contemplated of having rows H of packs of panels P transferred beyond the panel stopping and aligning bar member 2, just as it occurs in other stacking apparatus of known type. In this instance, the bar member 2 can be lifted and lowered and, can be translated so as to be caused to take over the blade-like member 3 in handling the material, (i.e., the rows H of packs of panels P moved out of the cutting line Z). Thus, the packs of panels P in these rows H are stacked in the desired arrangement on a unit diagrammatically designated by the reference numeral 5. Unit 5 comprises, for example, a lifting platform with a horizontally extending cover member on the top side thereof, which may be in form of a wedge or a steel strip, as disclosed in former Patents in the name of the same Patentee.

Once the required number of rows H of packs of panels P has been arranged on table 1, but normally at the time when the rows H of packs of panels P cut from a pack of large boards R inserted into the dividing apparatus, have been recomposed on table 1, the panel guiding and transferring bar member 4 is operated so as to transfer as a whole the rows H of packs of panels P obtained from the pack of large boards R, onto a parking table 6 arranged at one side of table 1. This parking table 6 has its outward side provided with a composite panel stopping and aligning barrier device formed by at least one immovable member 7' and by one or more movable members 7, which are connected to means for guiding and shifting these latter members in either direction of the double arrow F7. At one end side of the parking table 6, a panel-aligning stationary bar member 8 is provided in-line with the panel-stopping and aligning bar member 2. At the opposite end side of the parking table 6, a blade-like member 9 is provided in parallel relation with the bar member 8, and is operated by guiding and motivating means whereby the blade-like member 9 will be translated in either direction of the double arrow F9. The rows H of packs of panels P will be as a whole correctly laid and arranged on the parking table 6 by the members 4, 7, 7', 8, 9, the panel guiding and transferring bar member 4 being then returned into starting position.

On that side of table 6 which is opposite to the side thereof engaged by the members 7, 7' of the composite panel stopping and aligning barrier device, a panel-translating comb-like member 10 with its teeth being selectively lowerable and liftable, is arranged parallel to the members 7, 7'. As the panel guiding and transferring bar member 4 is transferring the rows H of packs of panels P onto the parking table 6, all of the teeth of the comb-like member 10 are set in their down position, so that they are prevented from interfering with the being-transferred packs of panels.

The comb-like member 10 has a reduced length, for example about one-half or one-third of the length of the long sides of the parking table 6, and has one side located at a short distance from the panel-aligning bar member 8. This comb-like member 10 is connected to means for guiding and moving it in either direction of the double arrow F10.

While the rows H of packs of panels P cyclically moved out of the cutting line Z are being laid and recomposed on table 1, the leading row H of packs of panels P which is set in contact with the panel-aligning bar member 8, is evacuated by the comb-like member 10 from the parking table 6, perpendicularly to the sides of said table 6. The teeth of the comb-like member 10 are set in such a raised position as to affect only the leading row H of packs of panels P to be evacuated from the parking table 6. At the same time, the movable members 7 of the panel stopping and aligning barrier device, lying opposite to the comb-like member 10, are positioned as close as possible to the row H to be evacuated, however without being allowed to interfere therewith. Once the leading row H has been evacuated from the parking table 6, the panel-translating blade-like member 9 is automatically operated, for the whole rows H of packs of panels P laid on the parking table 6, to be translated until the now-leading row H is caused to contact the panel-aligning bar member 8.

The row H of packs of panels P which has been evacuated from the parking table 6 is moved to a station 11, for example against a stationary abutment means Q1. In station 11 means are provided for the packs of panels P forming the evacuated panel row H to be transferred normally by turning onto the transport runway 12, as will be disclosed later. This runway 12 is for feeding the stacking platforms T in such a logic mode that when the packs of panels P are disposed with their short sides in the direction F10 in which they are shifted, these packs will be transferred onto the transport runway 12 without their arrangement being changed. However, when the packs of panels P are disposed with their long sides in the direction F10 in which they are shifted, these packs shall be turned over 90° around a vertical axis prior to being transferred onto the transport runway 12. Thus, the packs of panels will be always disposed on the runway 12 with their long sides in the direction in which they are conveyed.

Provided at the end section of station 11 is a gripper device 13 which in rest position is in-line with an extension of the panel-aligning bar member 8. The gripper device 13 is provided with two or more sequentially arranged gripper members 25, 125, which are selectively caused to clamp only the pack of panels P bearing against the stationary abutment means Q1, but no successive pack of panels. The gripper member or members 25, 125 of the gripper device 13, when set in operative condition, will firmly clamp a pack of panels P by the outward side thereof. Thereafter, when the gripper device 13 is operated, as it will be disclosed later, the inoperative gripper members are moved along with the operative gripper members, without adversely interfering with the packs of panels P at standstill in station 11.

The gripper device 13 may be operated in two different modes when a pack of panels to be transferred onto the transport runway 12 is already properly disposed with the long sides thereof directed parallel to the runway 12.

In the one mode, the gripper device 13 may be held at rest, with its gripper members 25, 125 in an open condition, as shown in FIG. 3, so that the gripper device 13 is caused to perform the function of prolonging the panel guiding and aligning action of the bar member 8. Thus, a properly disposed pack of panels P can be then transferred onto the transport runway 12 by the panel-translating comb-like member 10.

In this instance, it may be contemplated that when a number of successive rows H of packs of panels P, laid on the parking table 6, consist of packs of panels already disposed in the proper way for being moved onto the transport runway 12, more than one row H may be simultaneously acted upon by the panel-translating comb-like member 10. Thus, a plurality of properly disposed packs of panels will be simultaneously transferred onto the transport runway 12, and laid thereon in a sequential arrangement.

Otherwise, according to the other mode shown in FIG. 4, the gripper device 13 may be caused to take hold with one or more of its gripper members 25, 125, of a properly disposed pack of panels P bearing against the stationary abutment means Q1. Then, the gripper device 13 may be driven into such a rectilinear motion that this pack of panels will be translated and transferred onto the transport runway 12. It is obvious that the gripper device 13 is now caused to sequentially act only on the properly disposed packs of panels P in one panel row H.

However, when a pack of panels P bearing against the stationary abutment means Q1 is disposed with its long sides at right angles with the transport runway 12, as shown in FIG. 5, the gripper device 13 is caused to grip the pack of panels P by its gripper members 25, 125, and is then driven into a composite motion of rotation and translation: with this action, this pack of panels P is turned over 90° around a vertical axis and translated onto the transport runway 12, and the gripper device 13 comes to be positioned on that side of the runway 12 which is turned toward the station 11 and is adjacent thereto. In this position of the gripper device 13, the gripper members 25, 125 thereof are set in open condition, and the gripper device 13 is then moved in the reverse direction and returned into its starting position, ready for a new panel turning and translating cycle to be repeated. When in station 11 a plurality of sequentially arranged packs of panels P are awaiting to be moved onto the transport runway 12, and the leading pack of panels has been transferred onto this runway 12, the next-following packs of panels P are pushed forward by the comb-like member 10. Thus, each successive leading pack of panels is caused to bear against the stationary abutment means Q1, to be then acted upon as required by the gripper device 13.

The transport runway 12 may be of the motor-driven roller type. In this instance, provisions may be made for the packs of panels P to be transferred from the station 11 to the transport runway 12 by means of a schematically shown panel-lifting comb-like platform having its teeth arranged between the rollers forming the transport runway 12, and which is generally designated by reference numeral 15. When the panel-lifting comb-like platform 15 is set in its uplifted position, this platform receives a pack of panels P moved out of station 11, thus preventing any interference of this pack with the rollers forming the transport runway 12. Subsequently, comb-like platform is deposits the received pack of panels onto this runway 12. The panel-lifting comb-like platform 15 may be caused to cooperate with packs of panels P in a rolling or sliding friction mode, for example by means of small wheels or belts.

Otherwise, the transport runway 12 may be of the type consisting of sliding planes, or of freely rotatable rollers or wheels. In these instances, the packs of panels P are moved forward on the transport runway 12 by retractable pusher members and/or by gripper members. All this is conceivable and easily practicable by those skilled in the art, so that it is not shown in the accompanying drawings. It is obvious that when gripper members are used, the packs of panels P can be driven forward at a higher speed than with motor-driven rollers, but it is however ensured that the packs of panels will be maintained in the proper arrangement.

Figure 6:
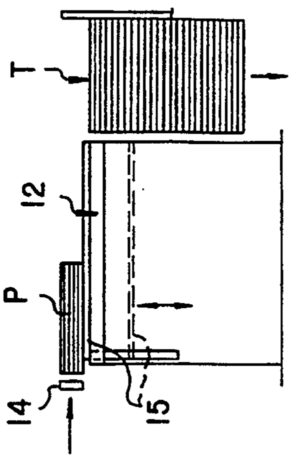
FIG. 6 is a side view showing a station for stacking packs of panels, provided in the apparatus according to FIG. 1.

In FIG. 6 there is shown that when a pack of panels P conveyed on the transport runway 12 has been moved up to a predetermined lifting platform T in-line therewith, this pack P is stopped and is translated onto this platform T by a pusher member 14. Subsequently, the pack P is lifted by a sliding or rolling friction panel-lifting comb-like platform 15.

Figure 2:
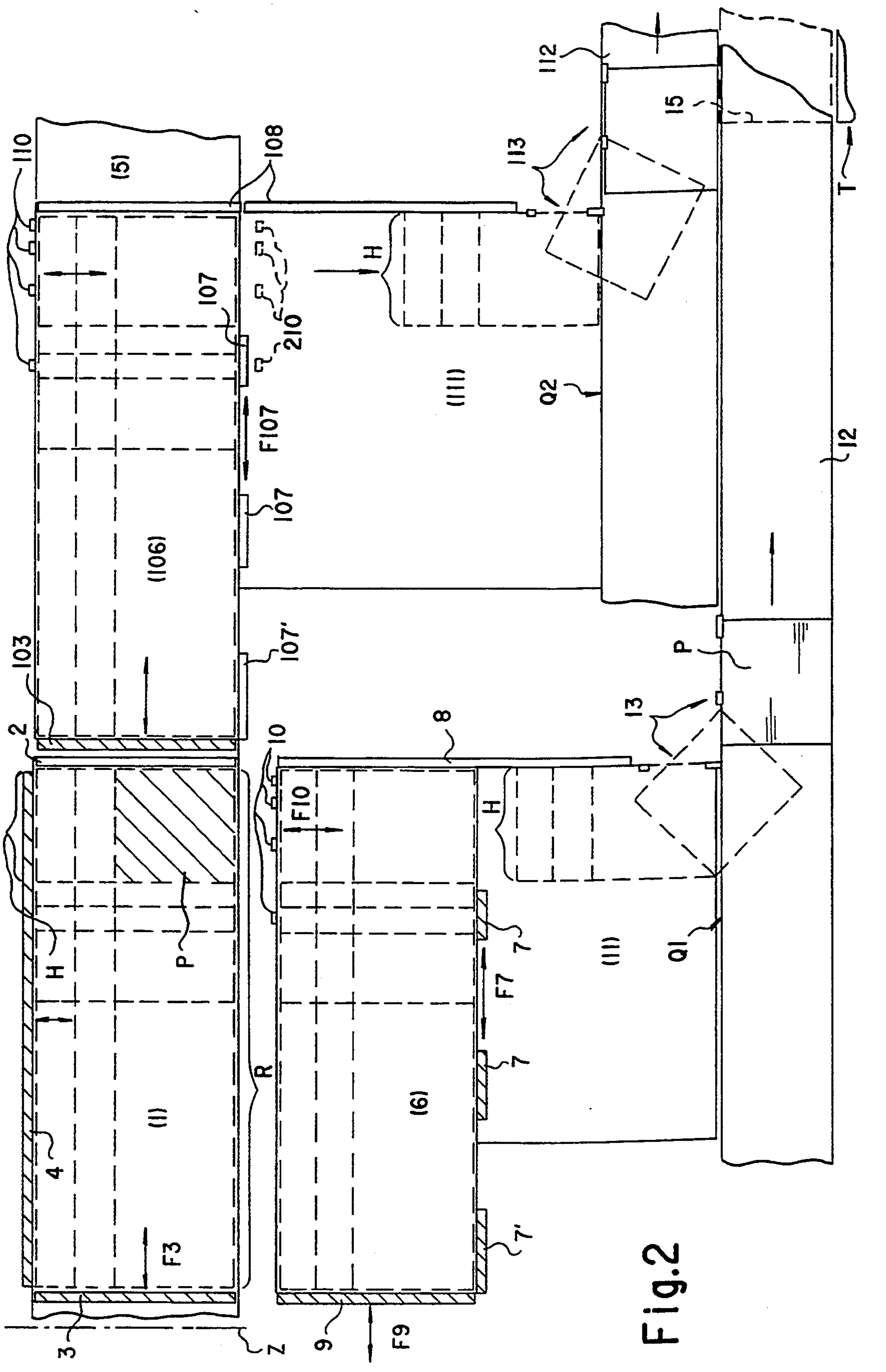

In FIG. 2 a modified embodiment is shown of the panel stacking apparatus. In the embodiment a second parking table 106 is provided, which is like the parking table 6 as disclosed by referring to FIG. 1, and is located downstream of table 1. The auxiliary panel-stacking unit 5 provided with the wedge-like cover member or with a cover member of an equivalent kind, which is like the panel-stacking unit 5 in the embodiment according to FIG. 1, may be now located downstream of the parking table 106.

The correct recomposition on the parking table 106 of a pack of large boards R cut into packs of panels P is achieved by means of a motor-driven blade-like member 103, which is like the above-disclosed blade-like member 3. Reference numeral 110 denotes the panel-translating comb-like member which is interlocked with the parking table 106, and reference numerals 107, 107' denote the members of a panel-stopping and aligning barrier device which is also interlocked with the said parking table 106.

Unlike the parking table 6, the parking table 106 is controlled by guiding and motivating means, whereby from a position in which the parking table 106 is coplanar to the table 1, this parking table 106 will be moved upon control into an uplifted position by an amount that is suitably greater than the thickness of the packs of panels P coming out of the dividing apparatus. The parking table 106 lies in a coplanar relation with the table 1 during the stage in which a pack of large boards R, suitably cut into packs of panels P, is being transferred from the table 1 onto the parking table 106. The parking table 106 is thereafter lifted by the predetermined suitable amount and is positioned in a coplanar relation with the station or panel-stacking unit 5. A station 111 is arranged at one side of the parking table 106. Station 111 is provided at its downstream end with a gripper device 113 for turning, or for turning and simultaneously translating packs of panels, in a like manner as disclosed for the units 11 and 13 shown in FIG. 1.

A row H of packs of panels P may be moved into and handled in station 111 either by the comb-like member 110 alone, or in conjunction with an auxiliary comb-like member 210. In this latter instance, the comb-like member 110 is driven into a predetermined stroke, as required for the row H of packs of panels P to be transferred from the parking table 106 to the station 111. There, this panel row is taken over by the comb-like member 210, to which is imparted such a logic motion as required for causing the packs of panels P in the said panel row H to bear by turns against the stationary abutment means Q2.

Figure 7:
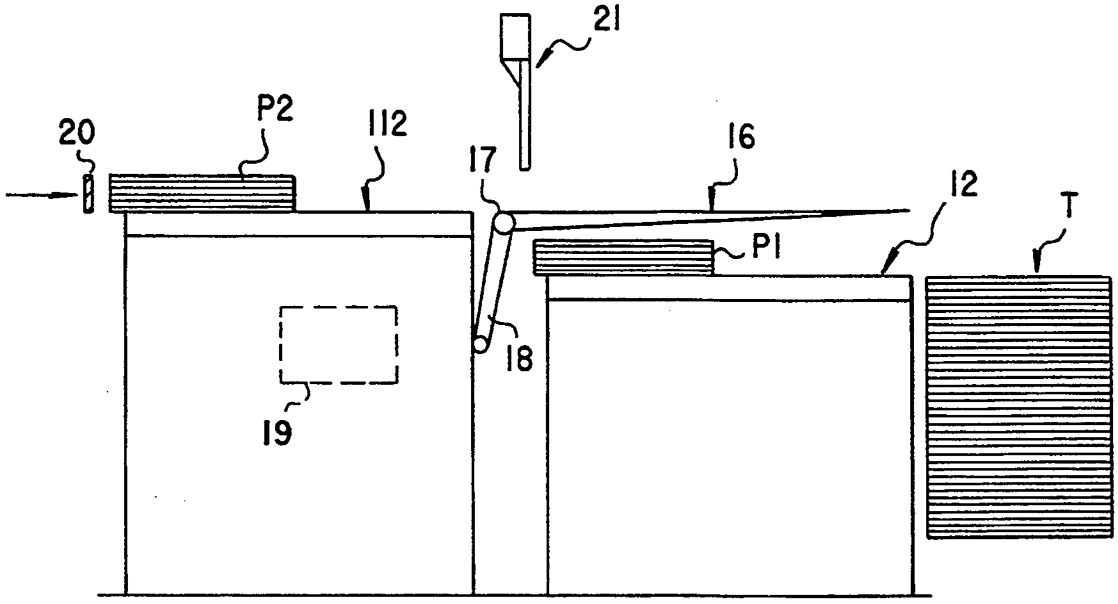
FIGS. 7, 8, 9, 10, and 11 are side views showing the sequence of the various operative steps in one of the stations for stacking packs of panels, provided in the apparatus according to FIG. 2.

Located downstream of station 111 is the transport runway 112 onto which single packs of panels P coming from the station 111 are cyclically transferred, with the long sides thereof being disposed in the panel conveyance direction as previously stated. The transport runway 112 is arranged in an adjoining, parallel relation with the transport runway 12 having lifting platforms T located near to the outward side thereof. As shown in FIG. 7, between the two transport runways 12, 112, a comb-like shelf member 16 is provided in close proximity of each lifting platform T, over the runway 12 and in bridge-like fashion between the runway 112 and the respective lifting platform T. The comb-like shelf member 16 has a wedge-like lateral profile tapering toward the respective lifting platform T and is pivotally connected at 17 to an underlying lever arm 18 so as to extend parallel to the transport runways 12, 112 the lever arm 18 is in turn connected to an actuator 19, such as a fluid pressure-operated piston-and-cylinder unit.

When the shelf member 16 is positioned as shown in FIG. 7, the upward face thereof is coplanar to the transport runway 112 so that the packs of panels P1 being conveyed on the transport runway 12 are allowed to freely pass with no interference under the shelf member 16.

Figure 8:
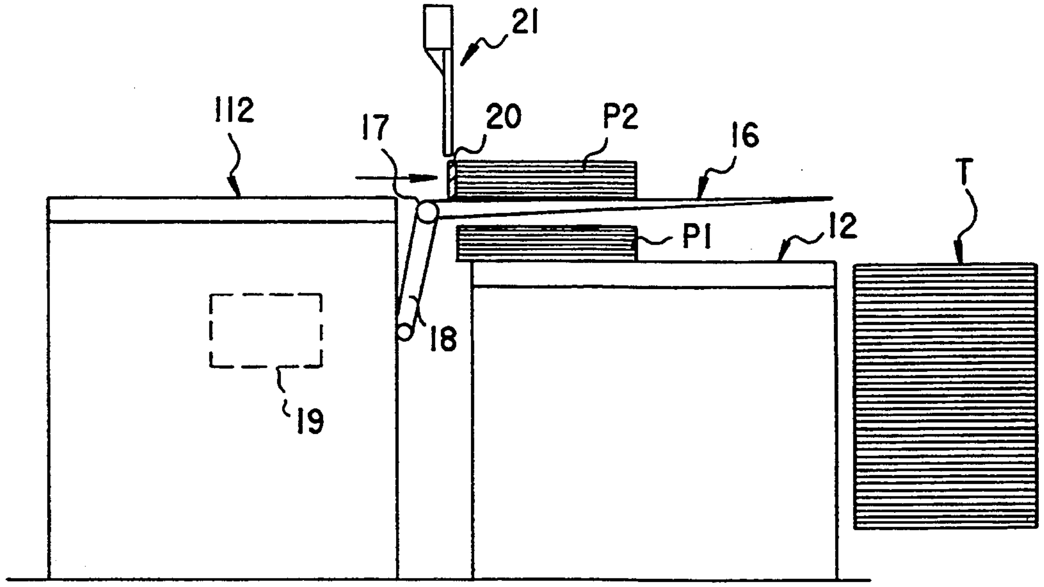
Figure 9:
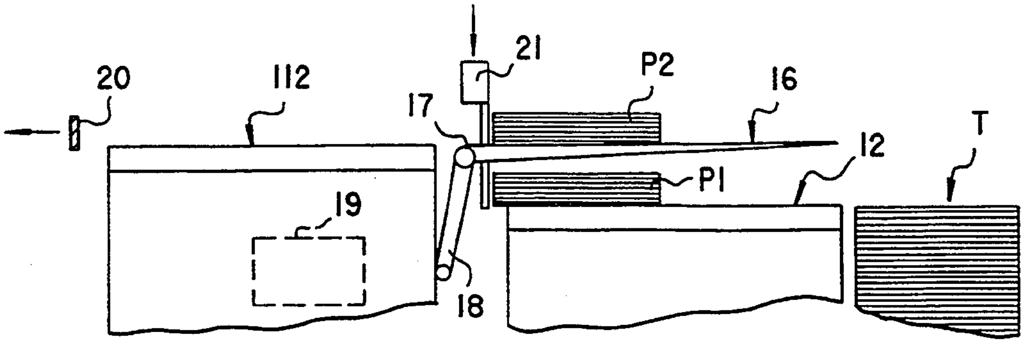
Figure 10:
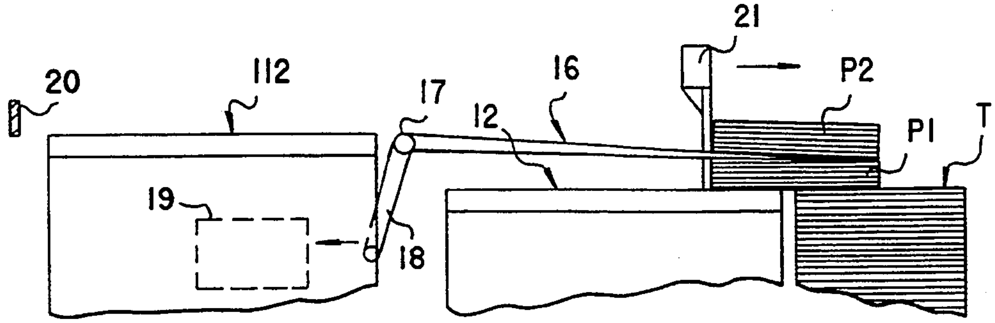
Figure 11:
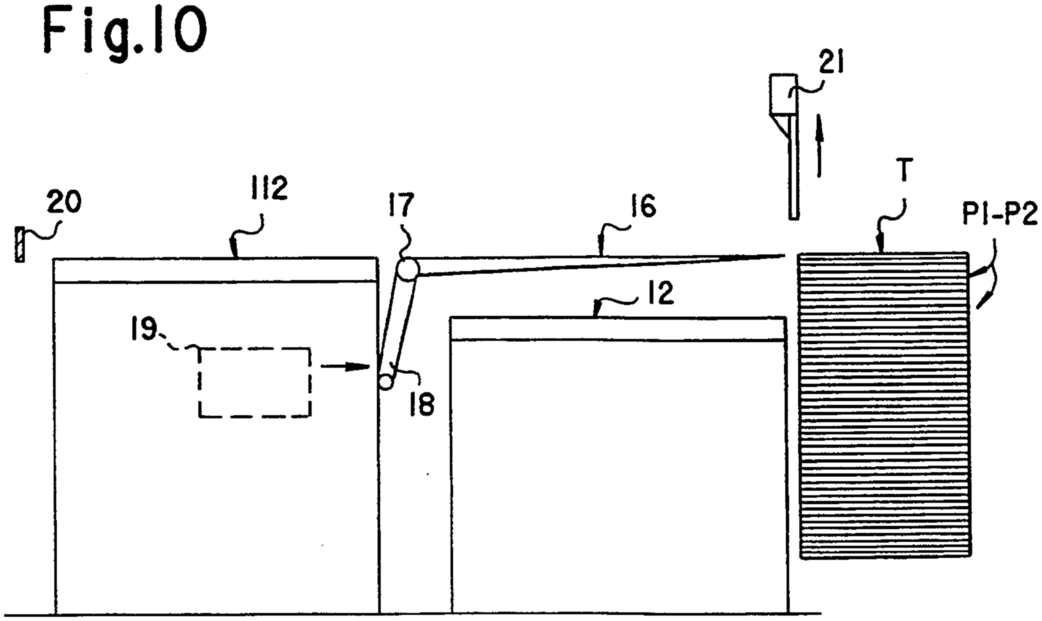

Two packs of panels P1, P2, which by the transport runways 12, 112 have been suitably conveyed to one and the same lifting platform T, can be simultaneously transferred onto this platform and stacked thereon in superimposed relation. According to the operative sequence shown from FIGS. 7 and 8, a pack P2 of panels is transferred by a pusher member 20 from the transport runway 112 to the comb-like shelf member 16 so as to be placed above the pack P1 of panels, laid on the transport runway 12. Then, as shown in FIG. 9, the pusher member 20 is returned into rest position, and a comb-like pusher member 21 is positioned at the rear end side of both packs P1 and P2. The comb-like pusher member 21 is located over the comb-like shelf member 16, and is initially lifted up therefrom so that it is prevented from hindering the transfer of pack P2 from the runway 112 to the shelf member 16. The teeth of the comb-like pusher member 21 are inserted between the teeth of the comb-like shelf member 16, and the pusher member 21 is thereafter translated as shown in FIG. 10 whereby both packs P1, P2 will be simultaneously transferred onto the relative lifting platorm T. During such a transferring step, the actuator 19 is neutralized in order that the packs P1, P2 moved out of the shelf member 16 may be superimposed and stacked in their superimposed condition onto the relative lifting platform T. In FIG. 11 there is shown that on completion of the pusher member translating step, the pusher member 21 is returned into its uplifted position, whereupon it is set again in its cycle-starting position as shown in FIG. 7.

In FIGS. 12, 13, and 14 a modified embodiment is shown in which the stationary abutment means Q1, Q2 are not provided at that side of the respective transport runway 12, 112 which is turned toward the station 11, 111 for packs of panels P to be individually fed to the runway 12, 112, but are provided at the opposite, outward side thereof. These stationary abutment means located at the outward side of the transport runway 12, 112 may each consist of an abutment member or a panel-clamping member 22, 122, against which is caused to bear the leading pack of panels P in a panel row H being pushed forward respectively by the comb-like member 10 and by the comb-like member 110 alone or in conjuction with the auxiliary comb-like member 210. The gripper device 13, 113 is mounted on an associated table 23, 123 which is motor-driven, and is so guided as to be moved on a horizontal plane transversely to the respective transport runway 12, 112. Thus, the gripper device 13, 113 will be positioned in such a manner as to allow only the leading pack of panels P into abutment with the abutment member 22, 122. Thus, panels P will already be disposed in the proper way for its conveyance on the transport runway 12, 112, to be freely translated and conveyed thereon, as shown in FIG. 12.

Otherwise, when a pack of panels P needs to be turned over 90°, as shown in FIG. 13, this pack is clamped at one of its long sides by the gripper members 25, 125 of the gripper device 13 or 113 either before having been caused to contact the abutment member 22 or 122, or after that such a contact has occurred. In this latter instance, the abutment member in form of a panel-clamping member 22 or 122 will be suitably shifted so as to be prevented from interfering with the pack of panels P in the course of being turned. While this pack of panels P is being turned, the table 23 or 123 carrying the associated gripper device 13 or 113 is moved, when required, transversely to the transport runway 12 or 112. Thus, the long side of this pack, which is opposite to the long side thereof clamped by the gripper members 25, 125 of the gripper device 13 or 113 is caused to bear against the stationary abutment means Q1 or Q2, for example against the panel-clamping abutment member 22 or 122 has been restored in its operating condition.

Finally, as shown in FIG. 14, when the packs of panels P to be turned are of a small size, two or more of these packs at a time may be clamped by the gripper device 13 or 113 and turned over 90° while being simultaneously translated.

Figure 15:
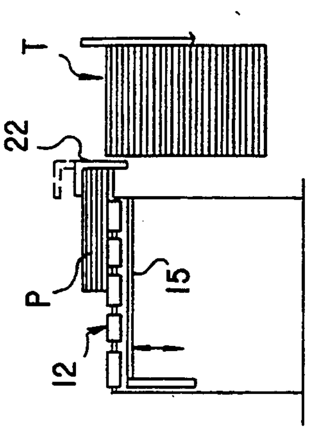
FIG. 15 is a sectional view showing some details taken on line XV—XV in FIG. 12.

In FIG. 15 there is shown that in the modified embodiment according to FIGS. 12, 13, 14, the packs of panels P are moved forward on the transport runway 12 or 112 by means of panel-clamping members 22 or 122. Members 22, 122 are set in operation along the stationary abutment means Q1, or Q2, and are withdrawn when a pack of panels is being transferred onto to a lifting platform T so as to be prevented from interfering with the being-transferred pack of panels P.

FIGS. 16 and 17 are views of the stacking apparatus according to FIG. 2, however modified as shown in FIGS. 12, 13, 14. In this modified embodiment, sidewise arranged panel-clamping members 22, 122 are used for the packs P1 and P2 of panels to be moved forward on the transport runway 12, 112. While the packs P2, P1 of panels are being transferred respectively from the transport runway 112 to a shelf member 16 and from the transport runway 12 to the relative lifting platform T, these packs may be supported just by the panel-lifting comb-like platforms generally designated by reference numeral 15 in FIGS. 6 and 15. These platforms are translated for closing the gaps left clear by the panel-clamping members 22, 122. All this is conceivable by a person skilled in the art, even though it is not shown in FIGS. 16 and 17. Such a technical problem does not arise when the packs of panels are moved forward on the transport runways 12, 112 by withdrawable panel-clamping members being caused to advance in-between the freely rotatable wheels or fixed shoes forming the runways, since in this instance the whole arrangement may be similar to the embodiment shown in FIGS. 7 to 11.

In planning the stacking apparatus according to the invention, the most important technical problem that the designer engineer had to face was the construction of the gripper device 13, 113 for turning over 90° around a vertical axis mutually in-line packs of panels P positioned at one side of the transport runway 12, 112 (for feeding the lifting platforms T), in that the gripper device 13, 113 must be such as to fundamentally meet the following requirements:

- The gripper device 13, 113 must be capable to act even on differently sized packs of panels;
- Normally, the leading, and not the next-following, pack of panels P is the sole item that the gripper device 13, 113 shall turn, but in certain cases the gripper device must be capable of simultaneously turning two or more sequentially arranged packs of panels of a small size;
- The leading pack of panels P, while being turned by the gripper device 13, 113, must not interfere with the successive pack of panels;
- The leading pack of panels P in the course of being turned should be preferably removed at the same time from the panel-withdrawal station 11 or 111, so as to have this station restored in its working condition as quickly as possible;
- When the leading pack of panels P has been, or is being turned by the gripper device 13 or 113, the successive pack of panels must be allowed to advance so as to be caused to bear against the abutment means Q1 or Q2;
- Once the leading pack of panels P has been turned, the gripper device 13, 113 must be moved backward without any interference with the just turned pack of panels or with the next-following pack of panels bearing against the reference abutment means Q1 or Q2.

Figure 18:
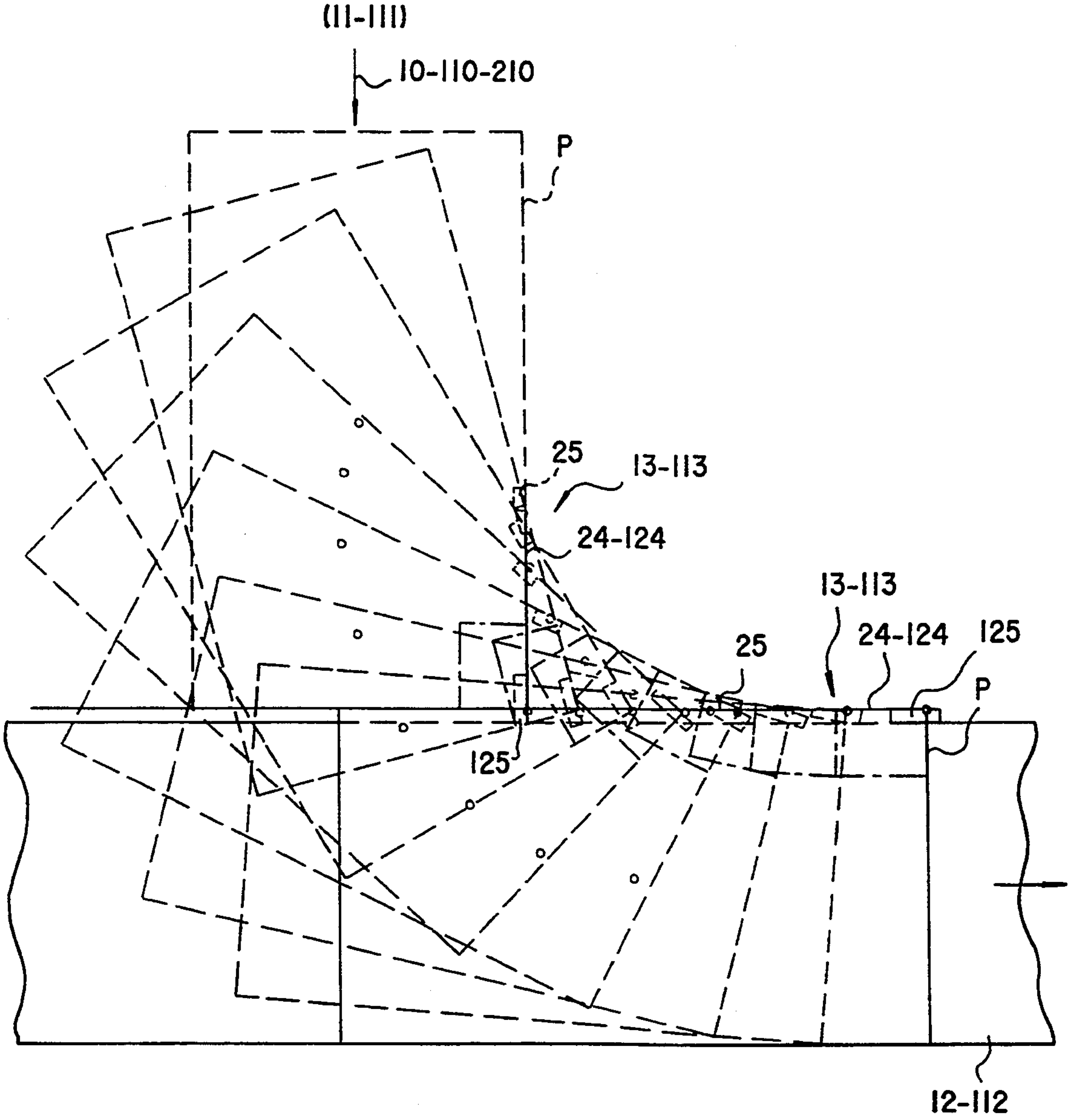
FIG. 18 is a diagrammatic top plan view of the device for feeding packs of panels to the transport runway interlocked with the lifting platforms for packs of panels of a same size to be respectively stacked thereon.

In FIG. 18 there is shown that the gripper device 13, 113 comprises a respective frame 24, 124 located in the room at the interior of the curve as traced by a pack of panels in the course of being transferred from the station 11 to the transport runway 12. The frame 12 carries two or more gripper members 25, 125 facing one side of a row of packs of panels P to be turned. The gripper members 25, 125 are preferably fixedly mounted to the associated frame 24, 124 in such a manner that these gripper members are not movable relative to the frame, but are movable into their open position and into their closed or clamping position. The gripper members 25, 125 are open toward the packs of panels P moved into the station 11, 111, which may be of a same or a different size. Thus, the gripper member 125 which is the nearer to the stationary abutment means Q1 or Q2 when the gripper device 13 or 113 is at rest, may be larger than the other gripper member 25 carried thereby. This allows the gripper member 125, in certain cases to act alone, to firmly clamp a pack of panels to be turned.

Figure 20:
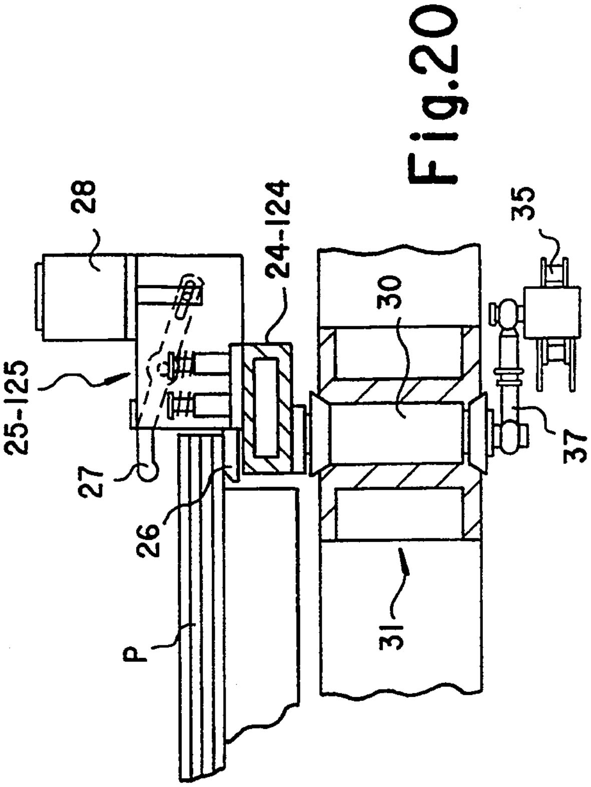
FIG. 20 is a sectional view showing some details taken on line XX—XX in FIG. 19.

The gripper members 25, 125 are made according to the known art, such as diagrammatically shown in FIG. 20. These gripper members 25, 125 are formed with a lower jaw 26 which is located slightly under the table whereon packs of panels P are supported and shifted so that this lower jaw 26 will not interfere with these packs. An upper jaw 27 is suitably spaced apart from the lower jaw 26, and can be lowered by an actuator 28. Each gripper member 25, 125 is restrained to the frame 24, 124 in such a manner that when the upper jaw 27 is caused to contact a pack of panels, the concerned gripper member 25, 125 is imparted such an upward movement that its lower jaw 26 is set in contact with and is caused to clamp this pack.

Guide means, not shown, arranged in the space between the gripper members 25, 125, and performing the same function as the panel-aligning bar member 8, 108, may be provided on the frame 24, 124. Such guide means are provided for preventing any undesired movement of the packs of panels P while being caused to travel from the one to the other gripper member 25, 125, owing to the pushing action of the comb-like member 10, or 110, or 210.

In the foregoing disclosure of the stacking apparatus there is pointed out that according to one possible operative mode, the gripper device 13, 113 must be capable of handling the packs of panels P so as to have the same translated or turned, according to whether these packs are or are not properly disposed for being transferred onto the transport runway 12 or 112.

Figure 19:
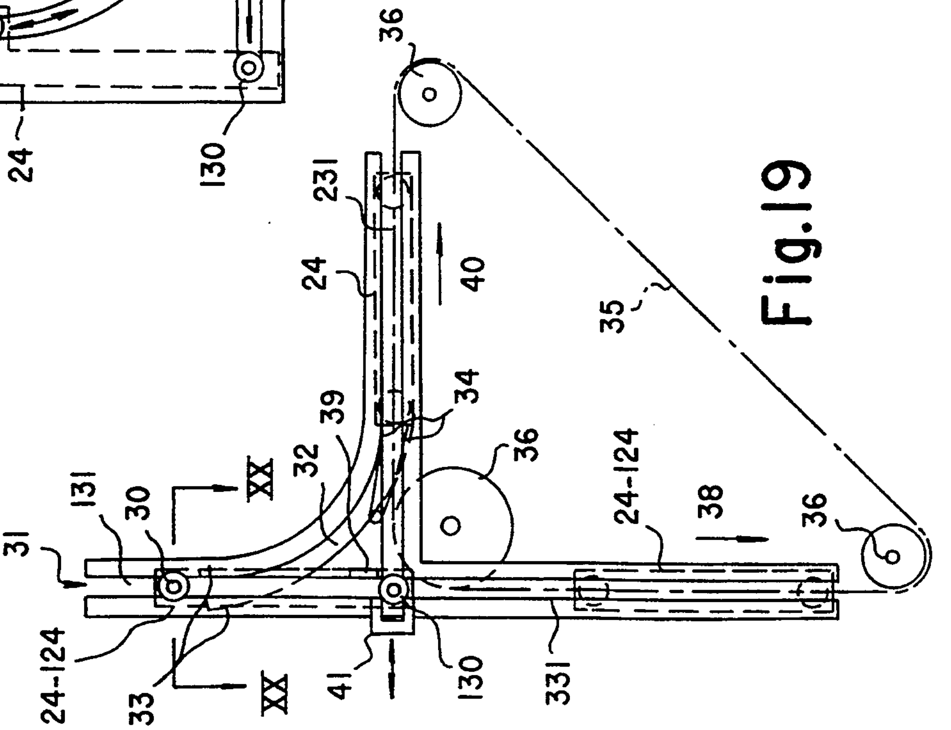
FIG. 19 is a plan view of a possible embodiment of the mechanism for driving the device shown in FIG. 18.

Therefore, the gripper device 13, 113 can be motivated as shown in FIG. 19. The frame 24, 124 is provided at the ends thereof with wheel means 30, 130 running in a rail 31 having a T-shape in plan view. With the gripper device 13, 113 in rest condition, the wheels 30, 130 engage the end stretch 131 of rail 31, and the wheel 130 is situated at the intersection of the rail stretch 131 with the rail stretch 231 extending perpendicularly thereto, as shown by solid lines in FIG. 19. Between the rail stretch 131 and the rail stretch 231 at right angles therewith, a curved rail 32 is provided which can be tangentially connected to the rail stretches 131, 231 by means of switches 33 and 34 controlled by suitable actuators, not shown.

Arranged parallel to the stretches 231 and 331 of rail 31 are the sections of a chain 35 led over three vertical axis pinions 36 and driven by any suitable motor unit rotating in both directions. As shown in FIG. 20, the chain 35 is connected through a link 37 to one end of the frame 24, 124, for example to an extension of the axle of wheel 30. When a pack of panels P clamped by the relative gripper member or members 25, 125 is to be translated by the gripper device 13, 113, the chain 35 is driven in the direction indicated by the arrow 38 in FIG. 19 so that the wheels 30, 130 on the frame 24, 124 are moved onto the stretch 331 of rail 31. At this stage, provisions may be made for the rail stretch 231 to be barred at the wheel 130 by a lock 39, prior to the chain 35 having been operated.

When a clamped pack of panels P is to be turned or, rather, it is to be turned and simultaneously translated by the gripper device 13 or 113 according to the operative sequence shown in FIG. 18, the rail stretches 131, 331 are barred by a lock 41. The switch 33 is then operated as shown by dash lines, and the chain 35 is driven in the direction of arrow 40. The wheel 130 runs on the rail stretch 231, and the wheel 30 runs on the curved rail 32 up to the switch 34, thus operating this switch and causing wheel 30 to be positioned on the rail stretch 231. With the reverse movement, when the wheel 30 is drawn away from the switch 34, this switch is returned into rest position by the load of spring means, so that the wheel 130 is allowed to run on the rail stretch 231 and to return into rest position.

In FIG. 18 there clearly appears that in this first possible operative mode of the gripper device 13, 113 the movements of the gripper members 25, 125 fully answer to the above-stated requirements, in that The leading pack of panels P is turned and is moved away from the next-following pack of panels, so that it will not interfere with this latter pack;

When the gripper member 125 is not in its closed or clamping condition, the same is moved away from the pack P of panels immediately following the leading pack of panels clamped by the gripper member 25 and being turned, so that the gripper member 125 will not interfere with the next-following pack P which remains at standstill;

When the turning of a pack of panels P has been completed by the gripper device 13, 113, the packs of panels in station 11 can be moved forward so as to be caused to bear in turn against the reference abutment means Q1 or Q2, without having to wait for the backward movement of the gripper device 13, 113, which occurs without the gripper members 25, 125 interfering with the packs of panels P laid in station 11;

Once a pack of panels has been turned, the gripper device 13, 113 can be immediately moved backward to the station 11, without the gripper members 25, 125 interfering with the just turned pack that has been transferred onto the transport runway 12 or 112;

While a pack of panels P is being turned, it is longitudinally and transversely moved away from the station 11, which turns to advantage for the working rate of the gripper device 13, 113.

The operative sequence shown in FIG. 18, is determined by a substantially centered position of the wheels 30, 130 relative to the gripper members 25, 125. If the gripper members 25, 125 are held at the interior of the path of the wheels 30, 130, the gripper members will be moved in an improved manner away from the packs of panels which are kept at dwell in station 11, and from the pack of panels having been transferred onto the transport runway 12 or 112.

It was observed that during the operation of the stacking apparatus, the gripper device 13, 113 should be preferably caused to perform such a motion of translation as to have its gripper members properly adapted onto a pack of panels P laid in the station 11, 111, or as to have this pack of panels properly positioned while it is being turned over 90°. In this instance, the gripper device 13, 113 is provided only for turning the packs of panels. As stated by referring to FIG. 12, the gripper device 13, 113 is mounted on a table 23, 123 which is operated by means being adapted for moving the device 13, 113 on a horizontal plane, perpendicularly to the longitudinal direction of the transport runway 12 or 112.

Figure 21:
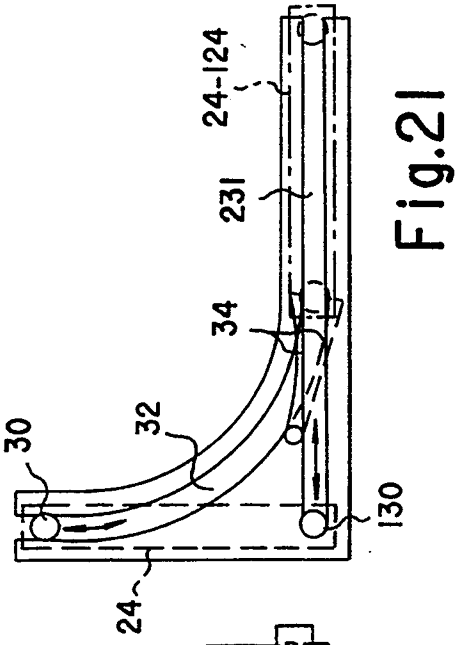
FIGS. 21, 22, 23 are plan views respectively showing a modified embodiment of the mechanism according to FIG. 18.

As shown in FIG. 21, the wheels 130, 30 on the frame 24, 124 carrying the gripper members 25, 125 of the gripper device 13, 113 can be guided respectively by a straight rail 231 and by a curved rail 32 tangentially merging into the former rail by means of the switch 34 provided with a return spring, as already disclosed in connection with the embodiment according to FIG. 19. In this instance, the gripper device 13, 113 is operated by an actuator imparting a rectilinear alternate motion, such as a fluid-pressure operated cylinder-and-piston unit, not shown, which is connected to the extension of the axle of wheel 130.

Figure 22:
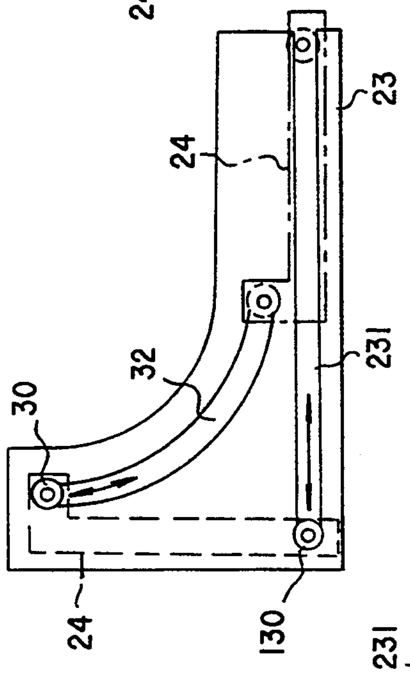

The embodiment according to FIG. 22 differs from the embodiment shown in FIG. 21 in that the switch 34 has been eliminated. The wheels 30, 130 on frame 24, 124 are not arranged in-line with each other like in the embodiment shown in FIG. 21, so that the rail 32 does not merge into the rail 231.

Figure 23:
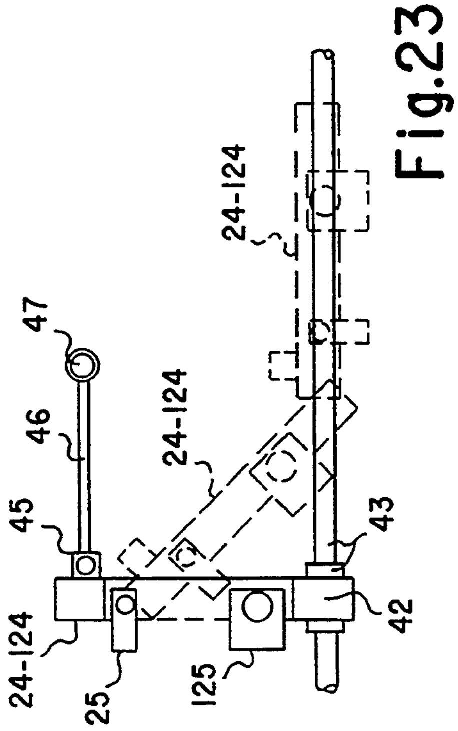
Figure 24:
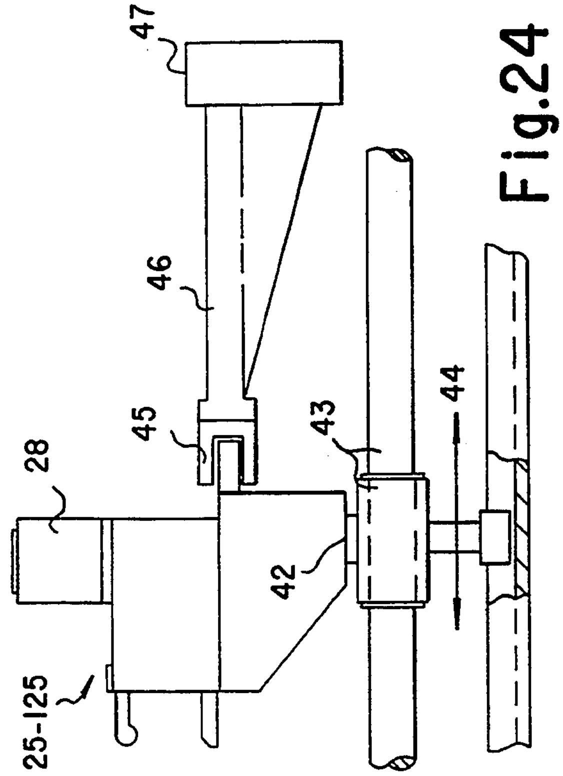
FIG. 24 is a front view of the mechanism shown in FIG. 23.

In FIGS. 23 and 24 there is shown a further simplified construction of the embodiment according to FIG. 21. The frame 24, 124 that carries the gripper members 25, 125 of the gripper device 13, 113 is connected at one end through a vertical articulated joint 42 to an assembly of straight slides and guides 43 arranged parallel to the longitudinal axis of the transport runway 12, with these slides being connected to an actuator 44 imparting them a rectilinear alternate motion. Through a vertical articulated joint 45, the other end of frame 24, 124 is articulated to a lever arm 46 which is swingably connected to a vertical shaft 47 that is ideally situated at the center of curvature of the rail 32 shown in FIG. 21. In the embodiment according to FIGS. 23 and 24, the use of rails and switches as in FIGS. 21 and 22, is avoided. The guides in the assembly 43 and the shaft 47 are both carried by the table 23, 123 by which the required motion of translation is imparted to the gripper device 13, 113.

Figure 25:
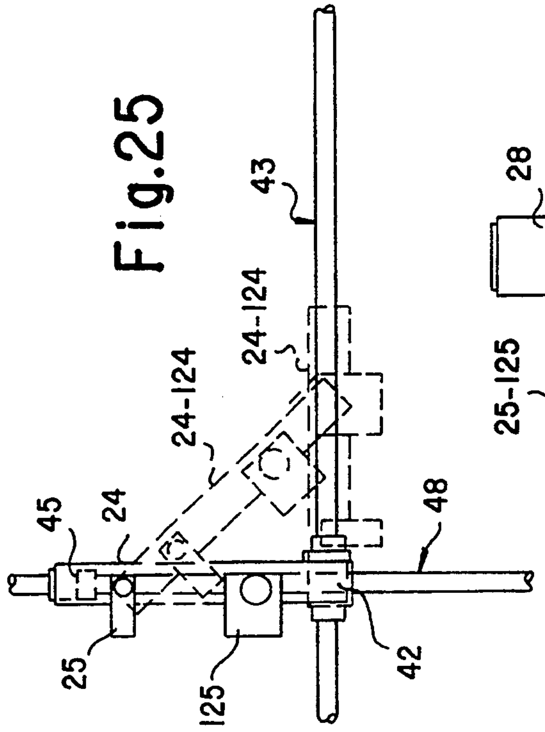
FIG. 25 is a plan view showing a further modified embodiment of the mechanism according to FIG. 18.
Figure 26:
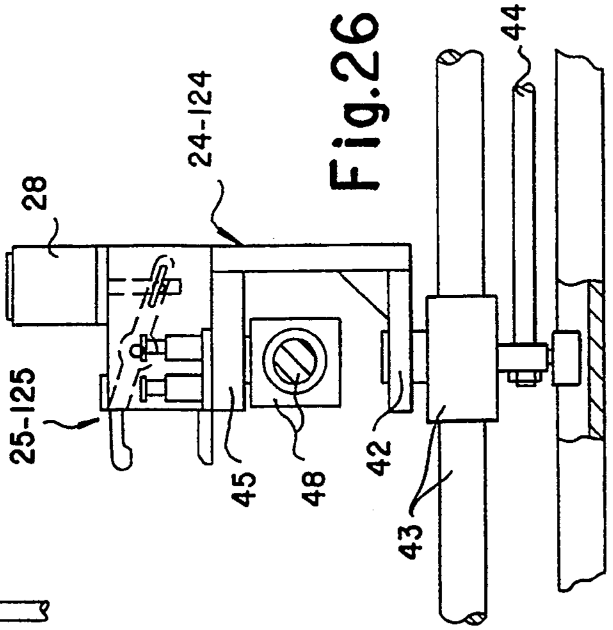
FIG. 26 is a front elevational view of the mechanism shown in FIG. 25.

FIGS. 25 and 26 show another modified embodiment derived from the preceding Figures. According to this modified embodiment, the ends of the frame 24, 124 are each connected through a vertical articulated joint 42, 45 to a respective assembly of rectilinear slides and guides 43, 48, the assemblies being arranged orthogonally to each other on horizontal planes lying the one above the other. The guide or guides in the assembly 43 are parallel to the longitudinal axis of the transport runway 12, 112, and the guide or guides in the assembly 48 are parallel to the longitudinal axis of station 11, 111. These guides are supported by the table 23, 123 by which the required motion of translation is imparted to the gripper device 13, 113. The slides in the assemblies 43 and 48 are here driven by respective actuators, such as of the fluid pressure-operated type. The whole arrangement is such as to be conceivable and easily practicable by those skilled in the art.

I claim:

1. An apparatus for automatically stacking differently sized packs of panels according to size, where a group of longitudinal rows and lateral columns of packs are formed side-by-side by a cutting device with a final cut of each row being made along a cutting axis parallel to the row so that the packs of each row have different lengths parallel to the cutting axis but same widths perpendicular to the cutting axis, the apparatus comprising:

a parking area located adjacent to the cutting device;

a shifting means for shifting the group of rows from the cutting device to said parking area with said rows remaining parallel to the cutting axis;

a transfer station located adjacent said parking area;

a removing means for removing a leading row of said group from said parking area to said transfer station in a direction parallel to the cutting axis, the direction of movement defining a leading edge for each pack;

a moving means for moving a remainder of the group of rows in said parking area so that a new leading row takes the place of the leading row previously removed by said removing means;

a transport means for transporting packs in a direction perpendicular to the cutting axis, said transport means being located adjacent said transfer station;

a gripper means for gripping at one side each pack at said transfer station sequentially and individually, and for delivering that pack (a) directly to said transport means with said leading edge parallel to the cutting axis where the leading edge is a longer side of said pack or (b) after a 90° rotation to said transport means with said leading edge perpendicular to the cutting axis where the leading edge is a shorter side of said pack; and a plurality of lifting platforms adjacent said transport means to which the packs are transported and piled with the same size packs being piled at the same said platforms.

2. An apparatus for stacking as claimed in claim 1:

further including a gathering surface upstream of the parking area on which successive groups of rows are delivered from the cutting device, and a first aligning means for shifting and aligning the rows of the group on said gathering surface to recompose the group into a rectangle;

wherein said shifting means shifts the rows from said gathering surface to said parking area;

further including a second aligning means for shifting and aligning the rows of the group on said parking area to recompose the group delivered thereto by said shifting means into a rectangle; and wherein said removing means is a comb pusher member with teeth selectively operable to be moved into and out of a plane of said parking area.

3. An apparatus for stacking as claimed in claim 2 and further including:

a second parking area located adjacent said gathering surface, said shifting means also selectively being used for shifting a subsequent group of rows from said gathering area located at a first height to said second parking area with said rows remaining parallel to the cutting axis;

a third aligning means for shifting and aligning the rows of the group on said second parking area to recompose the group delivered thereto by said shifting means into a rectangle;

an elevation means for vertically moving said second transfer station from said first height to a second height and back again;

a second transfer station located adjacent said second parking area and at the second height;

a second removing means for removing a leading row of said group from said second parking area at said second height to said second transfer station in a direction parallel to the cutting axis where the direction of movement defines a leading edge for each pack, said second removing means including a second comb pusher member with teeth selectively operable to be moved into and out of a plane of said second parking area;

a second moving means for moving a remainder of the group of rows in said second parking area so that a new leading row takes the place of the leading row previously removed by said second removing means;

a second transport means for transporting packs in a direction perpendicular to the cutting axis, said second transport means being located adjacent said second transfer station and at the second height;

a second gripper means for gripping at one side each pack at said second transport station sequentially and individually, and for delivering that pack (a) directly to said second transport means with said leading edge parallel to the cutting axis where the leading edge is a longer side of said pack or (b) after a 90° rotation to said second transport means with said leading edge perpendicular to the cutting axis where the leading edge is a shorter side of said pack;

wherein said plurality of lifting platforms are adjacent a lower of said first-mentioned and second transport means and on a longitudinal side thereof which is opposite to that of the higher said transport means; and further including a shelf member for each said lifting platform which extends over the lower said transport means and which is coplanar with the higher said transport means.

4. An apparatus for stacking as claimed in claim 3:

wherein each said shelf member is comb shaped and has a wedge lateral profile with a tapered end adjacent an associated said lifting platform and a flaring end pivotally connected to a support member;

and further including, in association with each said shelf member, a servo control for controlling the pivoting of said shelf member between a clearance position where said shelf member permits packs to travel therebeneath and an engaging position where said tapered end is immediately adjacent a pack therebelow, a pusher means for selectively pushing packs from said second transport means to the associated said shelf member, a comb pusher member which passes through gaps in said comb shaped shelf member for pushing both a pack located on said shelf member and a pack located therebeneath on said first-mentioned transport means simultaneously to the associated said lifting platform as said servo control moves said shelf member to the engaging position.

5. An apparatus for stacking as claimed in claim 4 and further including, in association with each said shelf member, a comb lifter which lifts packs from said first transport means below the associated said shelf member.

6. An apparatus for stacking as claimed in claim 1 wherein said gripper means is located adjacent said transfer station at a position inside of a curve described by a pack which is rotated 90°;

and said gripper means includes a frame, two gripper members located at spaced apart locations on said frame and each said gripper member being selectively operable to come together and grip a pack therewith, a first means for reciprocally moving said frame in the direction of the cutting axis so as to deliver a pack directly to said transport means, and a second means for reciprocally moving said frame in a composite translation and rotation movement so as to deliver a pack to said transport means after a 90° rotation.

7. An apparatus for stacking as claimed in claim 6 and further including a guide means on said frame for holding the panels of a pack in alignment as the pack is moved.

8. An apparatus for stacking as claimed in claim 6 wherein said transfer station includes an abutment immediately adjacent said transport means against which the leading edge of an adjacent pack is moved by said removing means; and wherein after a leading pack is gripped by said gripper means and delivered to said transport means, said remòving means moves the leading edge of each succeeding pack of the row into engagement with said abutment.

9. An apparatus for stacking as claimed in claim 6 wherein said gripper means includes an abutment against which the leading edge of the leading pack of a row is engaged and said first means for reciprocally moving said gripper members also moves said abutment reciprocally in the direction of the cutting axis over said transport means such that a succeeding pack is held by said gripper members and the leading pack engaged with said abutment is then moved by said transport means.

10. An apparatus for stacking as claimed in claim 6 wherein after said gripper members on said frame are moved to deliver the pack to said transport means, said gripper members are moved to an open position to release the pack; and wherein said first and said second means for reciprocally moving said frame moves said frame with said gripper members in the open position.

11. An apparatus for stacking as claimed in claim 6 wherein said gripper members are spaced from one another such that two small packs are capable of being individually gripped by a respective said gripper member and moved simultaneously with said frame.

12. An apparatus for stacking as claimed in claim 6 wherein said parking area, said transfer station, said transport means and said lifting platforms are horizontally disposed in a common plane.

13. An apparatus for stacking as claimed in claim 6 wherein said gripper means includes a first guide and slide assembly by which a fore end of said frame is moved horizontally over a first rectilinear path perpendicular to the cutting axis, a second guide and slide assembly by which a rear end of said frame is moved selectively over a second rectilinear path which is perpendicular to the first rectilinear path or over a curved path connecting the first and second paths, and a means for selecting one of said second rectilinear path and said curved path depending on the need to rotate the pack gripped by said gripper means.

* * * * *